(12) United States Patent
Kahle et al.

(10) Patent No.: US 7,197,223 B2
(45) Date of Patent: Mar. 27, 2007

(54) GLASS FIBER MONITORING MODULE

(75) Inventors: Eberhard Kahle, Berlin (DE);
Hans-Peter Sandeck, Berlin (DE);
Steffen Laurisch, Grunheide (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 11/300,247

(22) Filed: Dec. 13, 2005

(65) Prior Publication Data
US 2006/0159412 A1    Jul. 20, 2006

(30) Foreign Application Priority Data
Dec. 14, 2004   (DE)   ............... 10 2004 060 452

(51) Int. Cl.
*G02B 6/00* (2006.01)
*G01N 21/00* (2006.01)

(52) U.S. Cl. .................. 385/135; 385/134; 385/88; 385/24; 385/42; 356/73.1

(58) Field of Classification Search .............. 385/53, 385/134, 35, 136, 137, 138, 139, 88, 89, 385/92, 94, 24, 135, 42; 356/73.1
See application file for complete search history.

(56) References Cited
U.S. PATENT DOCUMENTS 4,685,799 A * 8/1987 Brininstool ............... 356/73.1
5,228,105 A * 7/1993 Glista .......................... 385/89
5,694,511 A * 12/1997 Pimpinella et al. ........ 385/134
5,793,909 A * 8/1998 Leone et al. ................ 385/24
2006/0159412 A1* 7/2006 Kahle et al. ................ 385/135

FOREIGN PATENT DOCUMENTS

DE          103 17 620       11/2004  ............... 385/92 X

OTHER PUBLICATIONS

Fiber-Optic Monitoring Module PROFIL 90/10 (and its English translation) (admitted by Applicants as prior art as of Dec. 14, 2004).

* cited by examiner

*Primary Examiner*—Brian M. Healy
(74) *Attorney, Agent, or Firm*—Merchant & Gould, P.C.

(57) ABSTRACT

The invention relates to a glass fiber monitoring module comprising a mounting plate, couplings for receiving plugs of incoming and outgoing glass fibers and at least one coupler module being arranged on the mounting plate, couplers being arranged in the coupler module and being used to split the signals of one incoming glass fiber between at least two outgoing glass fibers at a predeterminable ratio, one outgoing glass fiber transmitting a useful signal and the other glass fiber transmitting a test signal, the glass fibers carrying the test signals being combined in the coupler module to form one multifiber cable, a splitting element being arranged at that end of the multifiber cable which is remote from the coupler module and being used to split the multifiber cable into a number of monofiber cables which corresponds to the number of fibers, plugs being arranged at the ends of said monofiber cables.

14 Claims, 7 Drawing Sheets

GLASS FIBER MONITORING MODULE

TECHNICAL FIELD

The invention relates to a glass fiber monitoring module.

BACKGROUND

Monitoring of glass fibers is becoming increasingly important.

DE 103 17 620 A1 discloses a glass fiber coupler module, comprising a cassette carrier, which is connected to a front panel, the cassette carrier having an associated coupler by means of which the signals of at least one incoming glass fiber are distributed over at least two outgoing glass fibers, a first group of couplings and a second group of couplings, the second group of couplings being arranged on the front panel, glass fibers of the first group of couplings being passed into the coupler, and the outgoing glass fibers from the coupler being connected to the second group of couplings, the first group of couplings being arranged on a mounting plate which is arranged on the cassette carrier such that it can pivot.

Known under the product designation "Gf-Überwachungsmodul PROFIL 90/10" [glass fiber monitoring module PROFIL 90/10], released Nov. 22, 2004, is a glass fiber monitoring module, comprising a mounting plate, couplings for receiving plugs of incoming and outgoing glass fibers and a coupler module being arranged on the mounting plate, couplers being arranged in the coupler module and being used to split the signals of one incoming glass fiber between two outgoing glass fibers at a predeterminable ratio (in this case 90/10), one outgoing glass fiber transmitting a useful signal (90%) and the other glass fiber transmitting a test signal (10%). The couplings for the incoming glass fibers and the outgoing glass fibers carrying the useful signal are all arranged in a row. The mounting plate is arranged in a housing, the couplings being arranged at an angle with respect to the front side of the housing. Next to the row of couplings for the incoming and outgoing glass fibers is arranged a second row of couplings for the glass fibers carrying the test signal, which are perpendicular to the front side of the housing. In order to protect the plugs and for labeling purposes, a removable cover is arranged on the housing and is fixed laterally on the housing. Arranged on the other end face is a deflecting element, by means of which the glass fibers can be passed from the couplings in the direction of the rear side of the housing whilst maintaining the permitted bending radii. The test signals for permanent monitoring can then be fed to a measuring device via the couplings in the second row. In this case it is necessary for the cover to have a sufficient spacing from the couplings in order for the minimum bending radii for the glass fibers having the test signals to be maintained. The couplings in the second row may also be used for temporarily limited measurements, for example for adjusting transmission devices, for which purpose, however, in this case the cover needs to be removed. One disadvantage of the known glass fiber monitoring module is the fact that the pushed-forward cover requires a relatively large amount of space which is not available with all installation types. Furthermore, passing the glass fibers from the second couplings via the deflecting element is relatively complex, since there is relatively little space.

SUMMARY

The invention is therefore based on the technical problem of providing a glass fiber monitoring module which makes it easier to implement permanent monitoring.

For this purpose, the glass fibers carrying the test signals are combined in the coupler module to form one multifiber cable, a splitting element being arranged at that end of the multifiber cable which is remote from the coupler module and being used to split the multifiber cable into a number of monofiber cables which corresponds to the number of fibers, plugs being arranged at the ends of said monofiber cables. This means that now only one cable needs to be passed in the region of the glass fiber monitoring module (instead of the large number of mono-glass fiber cables). This one multifiber cable can be handled more easily and can also be formed with kink protection so as to maintain the bending radii. The plugs are preferably provided at the end of the monofiber cable with an APC ground section which prevents, even when the plugs are not inserted, reflections which would otherwise interfere with the operating signal.

In one preferred embodiment, a holder for a reserve length of the multifiber cable is arranged on the mounting plate or on the coupler module. This makes it possible for the glass fiber monitoring module to be arranged relatively flexibly in relation to the test devices. For this purpose, for example 5 to 10 m are retained, wound up, in the glass fiber monitoring module as the reserve length, it being possible for the length of the cable from the module up to the plugs to be selected as desired, depending on the customer's requirements. Then, if later on a modification is carried out, there is still always the reserve length available.

In a further, preferred embodiment, the holder for the reserve length comprises a winding core and a winding cover.

In a further, preferred embodiment, the incoming glass fibers are split in the coupler modules between three outgoing glass fibers, one outgoing glass fiber transmitting the useful signal and the other two outgoing glass fibers transmitting a test signal, one glass fiber carrying the test signal being combined to form the multifiber cable, and the other glass fiber carrying the test signal being passed to a coupling. This makes it possible at the same time to carry out permanent and temporary monitoring.

In a further, preferred embodiment, the glass fiber monitoring module comprises two coupler modules, which are arranged on the front and rear side of the mounting plate, the incoming glass fibers being split between the two coupler modules, the glass fibers, which are to be combined to form the multifiber cable, of one coupler module being passed to the other coupler module where they are combined to form the multifiber cable. This makes it possible to use two couplers for producing the three outgoing glass fibers, which is relatively cost-effective and technically simple, it easily being possible for the relatively large amount of space required for this to be made available by the two coupler modules.

In a further, preferred embodiment, the mounting plate is arranged in a housing, a cover being arranged on the housing which covers the couplings, a deflecting element being arranged laterally, via which the incoming and outgoing fibers or cables are passed. Further preferably, in this case the spacing between the cover and the couplings can be adjusted and/or the cover is arranged on the housing such that it can pivot. In particular, the fact that the cover can be displaced makes it possible (given sufficient space at the front) to carry out temporary monitoring when the cover is closed without falling below the bending radii.

BRIEF DESCRIPTION OF THE DRAWINGS

The invention will be explained in more detail below with reference to a preferred exemplary embodiment. In the figures.

DETAILED DESCRIPTION

Figure 1:
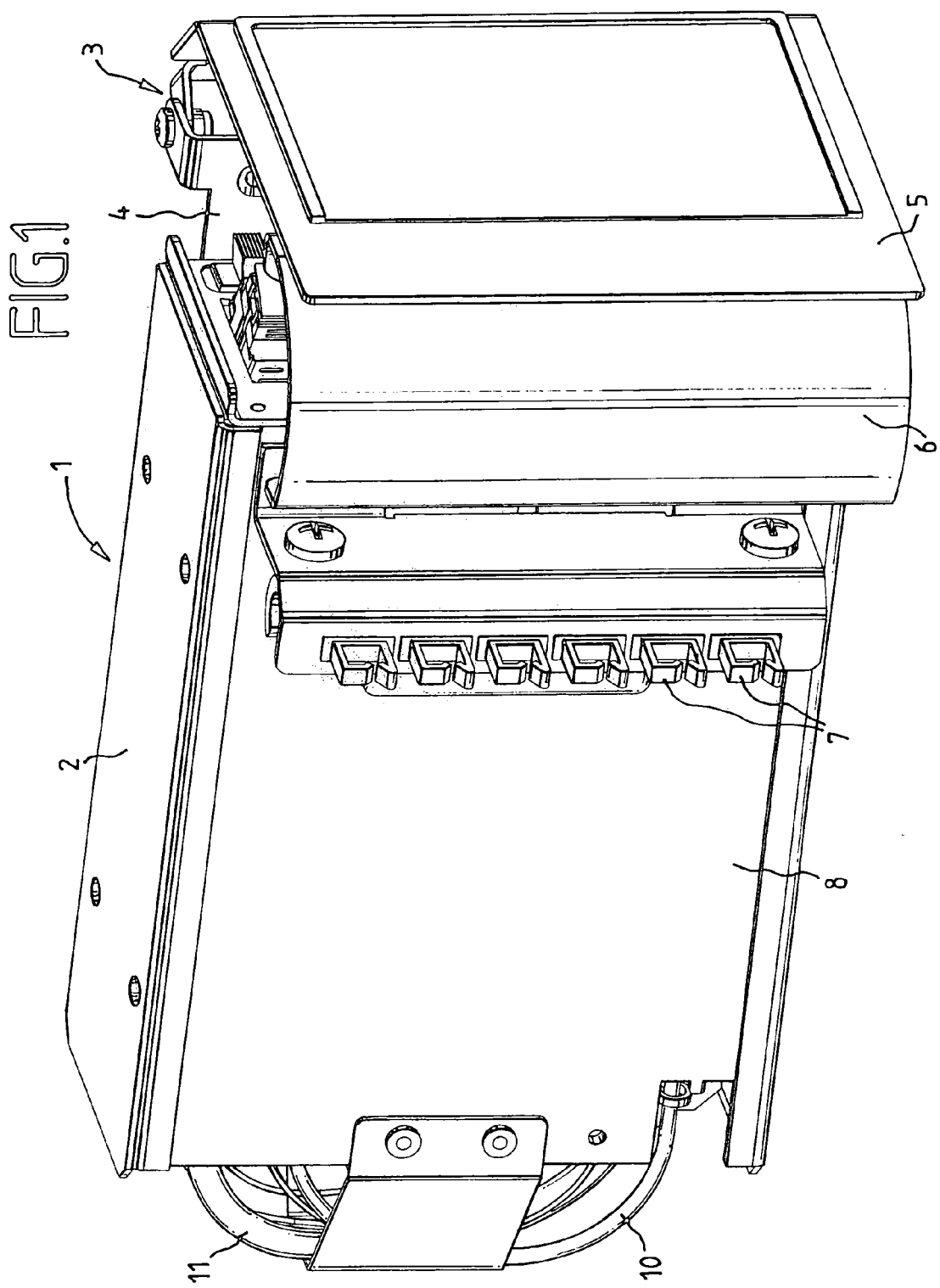
FIG. 1 shows a perspective side view of the glass fiber monitoring module.
Figure 2:
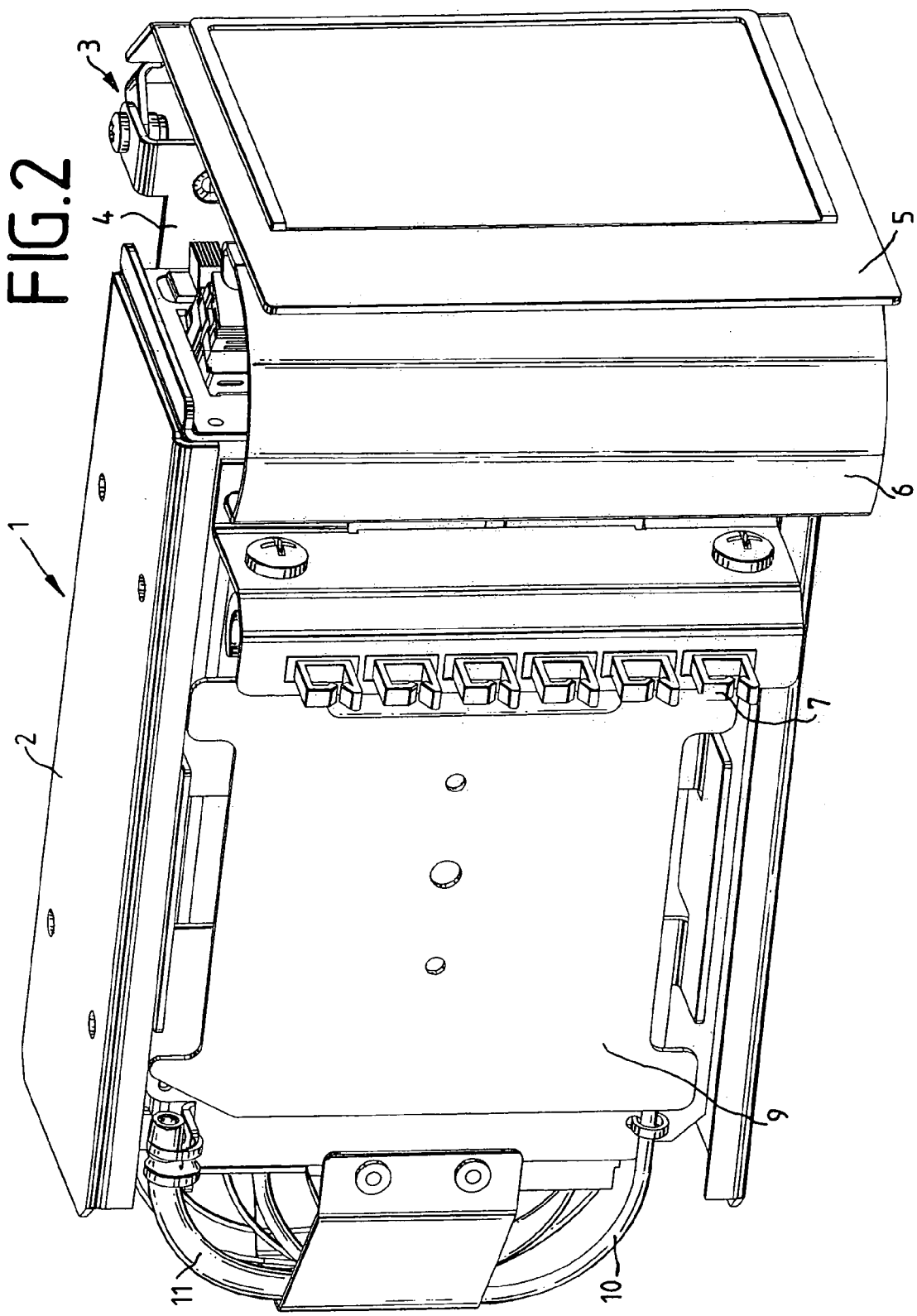
FIG. 2 shows a perspective side view of the glass fiber monitoring module without the side wall.
Figure 3:
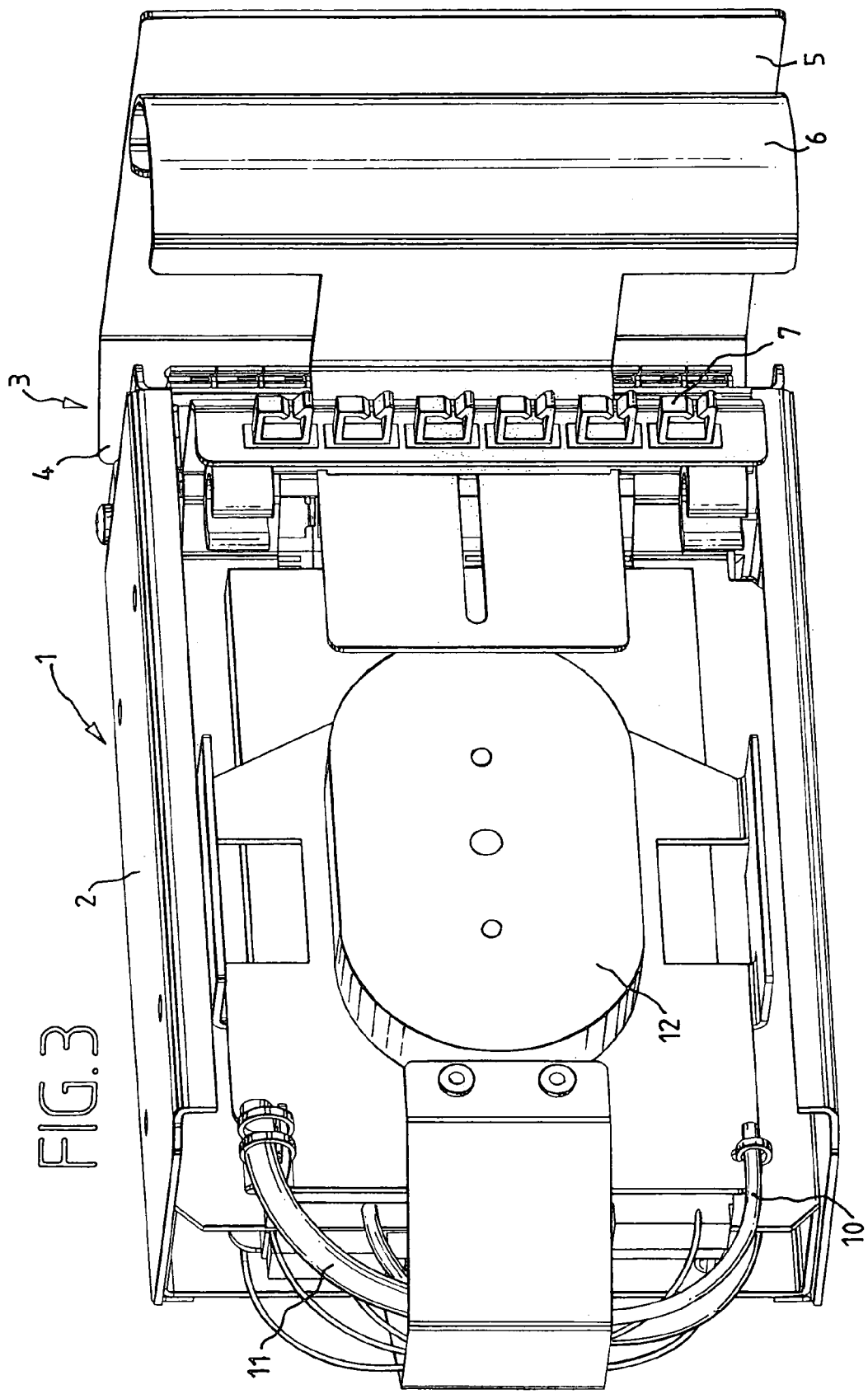
FIG. 3 shows a perspective side view of the glass fiber monitoring module without the side wall and the cover for the holder.

FIG. 1 shows the glass fiber monitoring module 1. The glass fiber monitoring module 1 comprises a housing 2, a cover 3, which can be pivoted, being arranged laterally on said housing 2. The cover 3, which can be pivoted, in this case comprises a plate 4, whose position relative to the housing 2 can be displaced, for example by means of a knurled screw. This makes it possible to adjust the spacing between a front panel 5 and a deflecting element 6 arranged on the other side. Furthermore, lateral guides 7 for the glass fibers are illustrated. In FIG. 2, the side wall 8 shown in FIG. 1 is removed, with the result that a winding cover 9 can be seen. This winding cover 9 is part of a holder for a reserve length on a multifiber cable 10, part of which is shown in FIGS. 1 and 2, the multifiber cable 10 being formed in part with a tube 11 as kink protection, which will be explained in more detail later with reference to FIG. 4. FIG. 3 shows the glass fiber monitoring module 1 without the side wall 8 and without the winding cover 9, with the result that a winding core 12 can now be seen, around which the reserve length of the multifiber cable 10 is wound. Before the wiring in FIG. 4 is explained in more detail, the general interconnection using six incoming fibers will be explained in more detail with reference to FIGS. 5 and 6.

Figure 6:
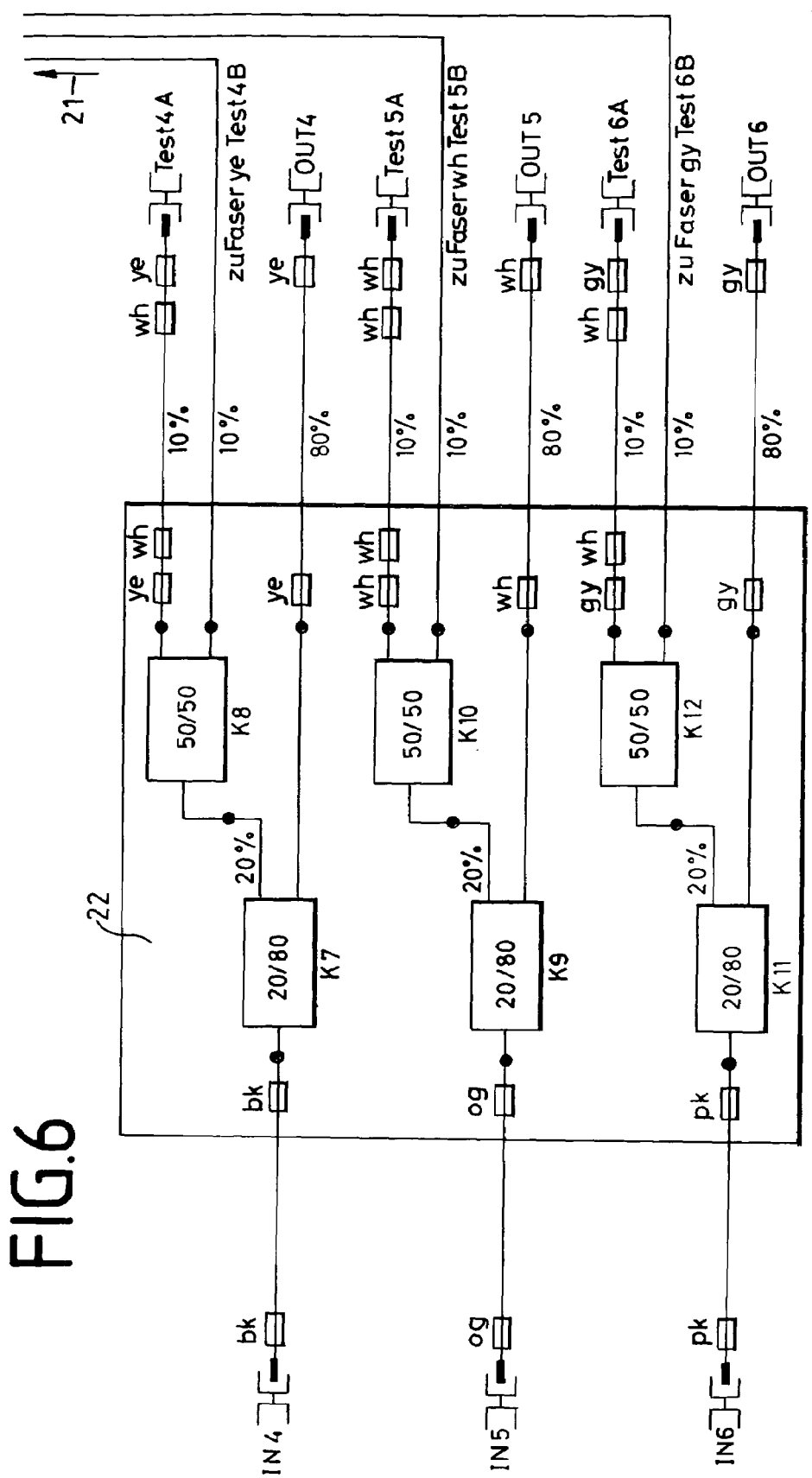
FIG. 6 shows a schematic circuit diagram of the second coupler module.

The six incoming fibers come from six couplings which are hidden by the cover 3 and are split between two coupler modules 21, 22. Initially, the interconnection of the first coupler module 21 will be explained in more detail. The first three incoming glass fibers from the couplings IN1-3 are connected in the coupler module 21 to in each case one coupler K1, K3 and K5, where the signals are split at a ratio of 20/80. The fibers having 80% of the optical power are then in each case connected to a coupling OUT 1–3. These outgoing fibers are the outgoing fibers transmitting the useful signal. The fibers at the output of the couplers K1, K3 and K5, which each transmit 20% of the optical power, are passed to second couplers K2, K4 and K6, where they are split at a ratio of 50/50. Here, in each case one fiber is passed as an individual fiber to a coupling Test 1A, Test 2A and Test 3A, whereas the respective other fibers Test 1B, Test 2B and Test 3B are combined to form the multifiber cable 10. Also taken into account in this case when combining the fibers to form the multifiber cable 10 are the three fibers Test 4B, Test 5B and Test 6B which are passed from the second coupler module 22 to the first coupler module 21. FIG. 6 shows the interconnection of the second coupler module 22. The incoming glass fibers from the couplings IN 4–6 are connected to first couplers K7, K9 and K11 and split there at a ratio of 20/80. The fibers transmitting in each case 80% of the useful signal are then passed to couplings OUT4–6, whereas the glass fibers transmitting 20% are passed to second couplers K8, K10 and K12, where they are again split at a ratio of 50/50. In each case one fiber at the output of the coupler K8, K10 and K12 is passed as an individual fiber to the couplings Test 4A, Test 5A and Test 6A. The respective other fibers Test 4B, Test 5B and Test 6B are passed to the first coupler module 21 and combined there with the fibers Test 1B, Test 2B and Test 3B to form the multifiber cable 10. This multifiber cable 10 in this case comprises the six fibers Test 1–6B, which are surrounded by a common sleeve. A Kevlar layer is then preferably provided around this sleeve and, in turn, the actual cable sheath is provided on this Kevlar layer.

Figure 4:
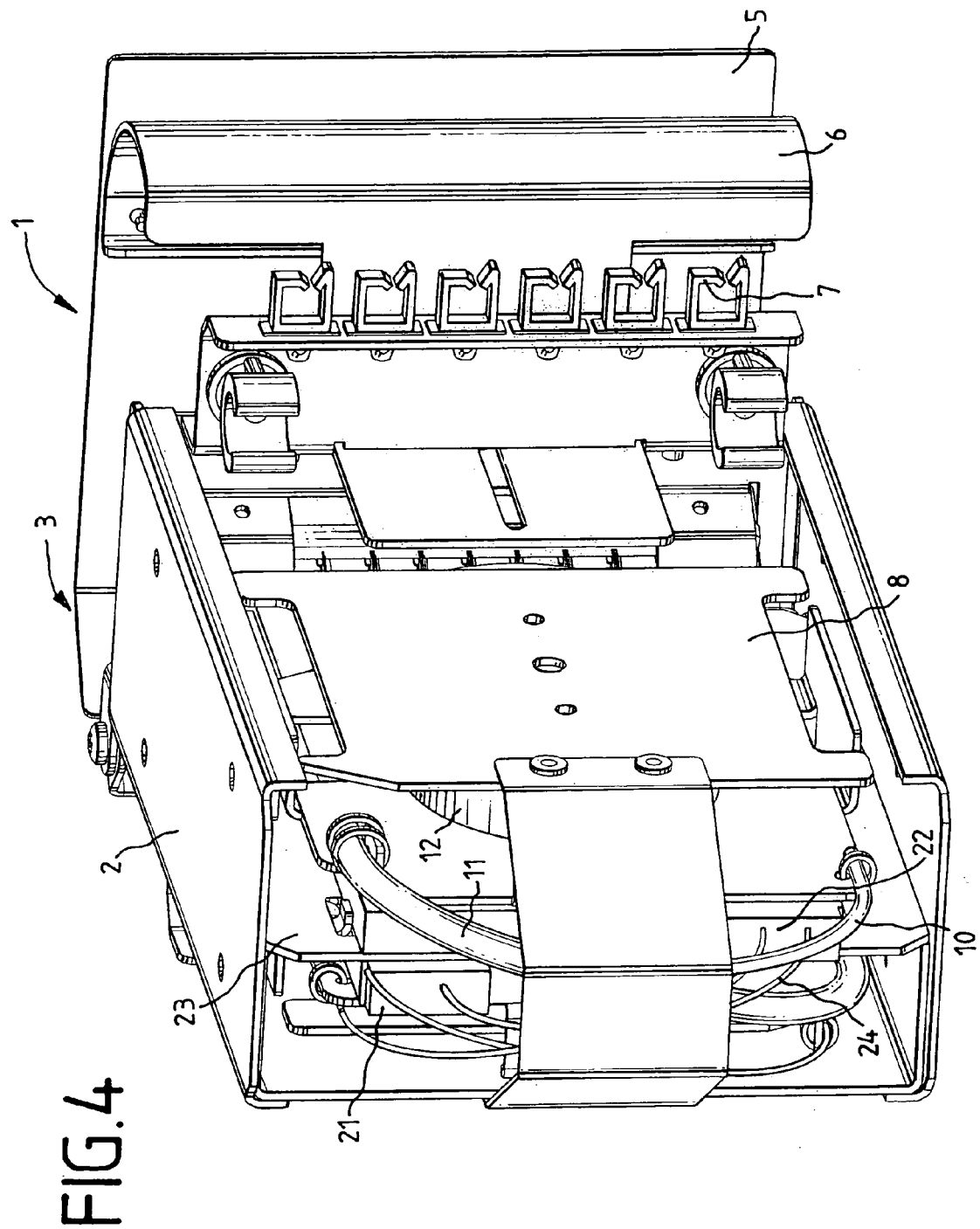
FIG. 4 shows a perspective rear view without the side wall.
Figure 5:
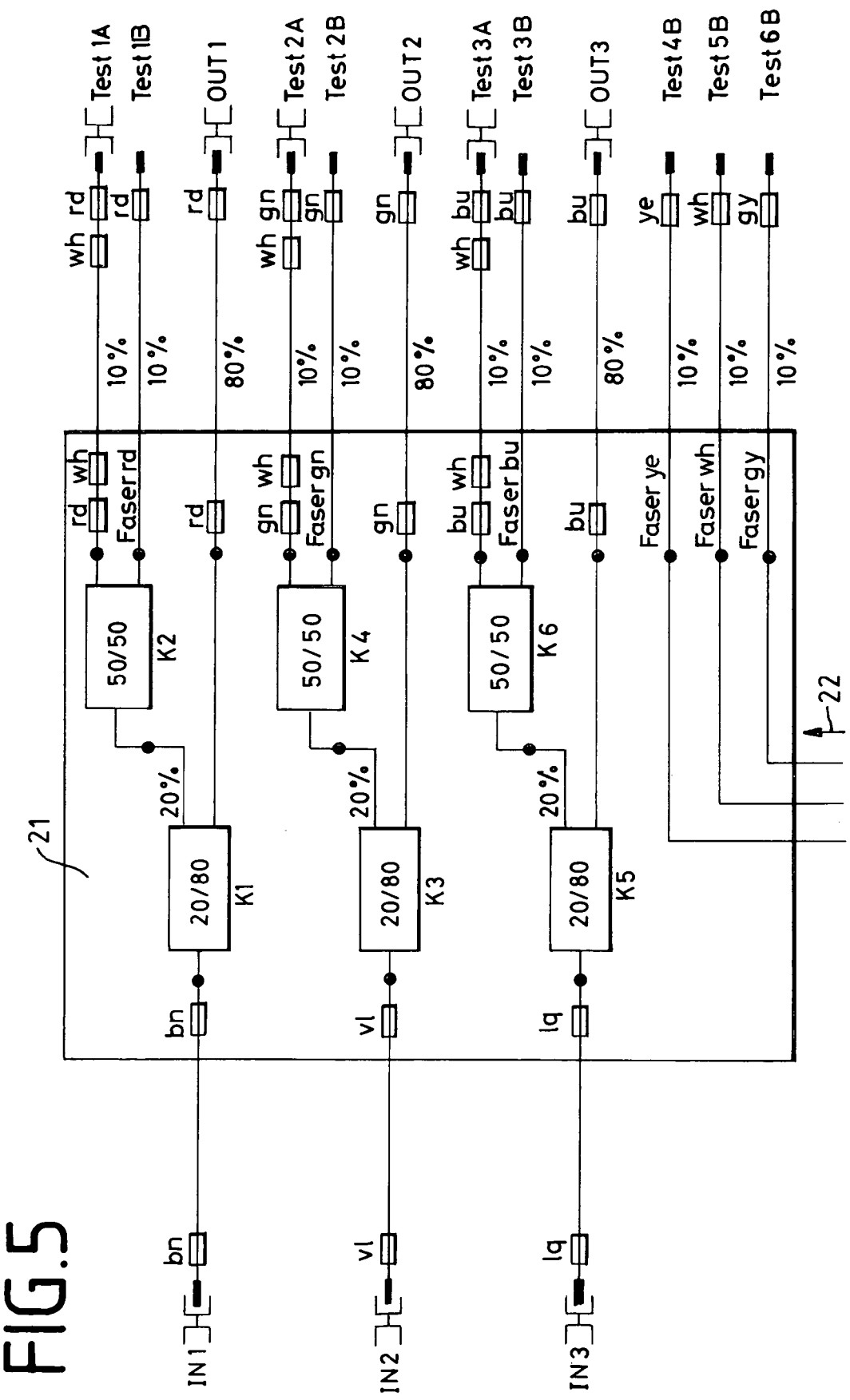
FIG. 5 shows a schematic circuit diagram of the first coupler module.

As can be seen in FIG. 4, the two coupler modules 21, 22 are arranged on a mounting plate 23 on the front and the rear side. The holder for the reserve length of the multifiber cable 10 is then arranged on the second coupler module 22. In this case, the multifiber cable 10 with the tube 11 is passed out of the first coupler module 21 into the holder for the reserve length. There, the multifiber cable 10 (without the tube) is wound onto the winding core 12 and passed in the direction of the cover 3. The glass fibers 24 are in this case the glass fibers Test 4B–6B, which are passed from the second coupler module 22 into the first coupler module 21. A device for holding reserve length for the incoming and outgoing glass fibers can then also be arranged on the first coupler module 21.

Figure 7:
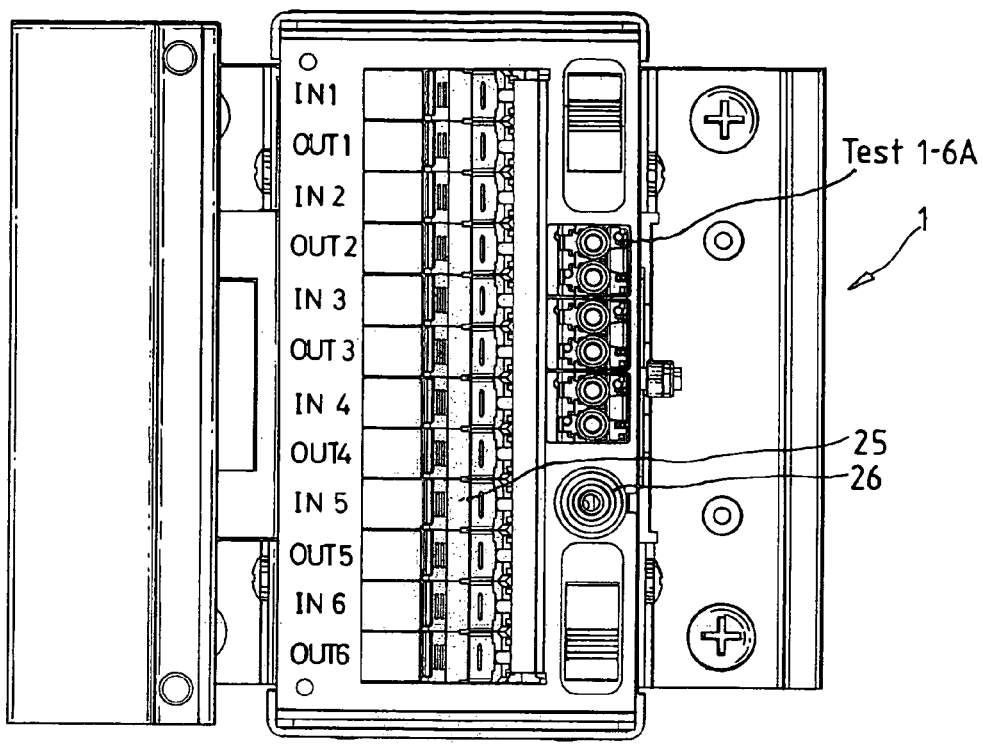
FIG. 7 shows a front view without the cover.

FIG. 7 shows a front view of the glass fiber monitoring module 1 without the cover 3. The first row of couplings 25 comprises in each case alternately a coupling IN 1–6 for the incoming glass fibers and a coupling OUT 1–6 for the outgoing glass fibers. A second row of couplings Test 1–6A serves the purpose of connecting glass fibers for temporary monitoring. A cable holder 26 for the multifiber cable 10 is arranged beneath the second row of couplings Test 1–6A.

Figure 8:
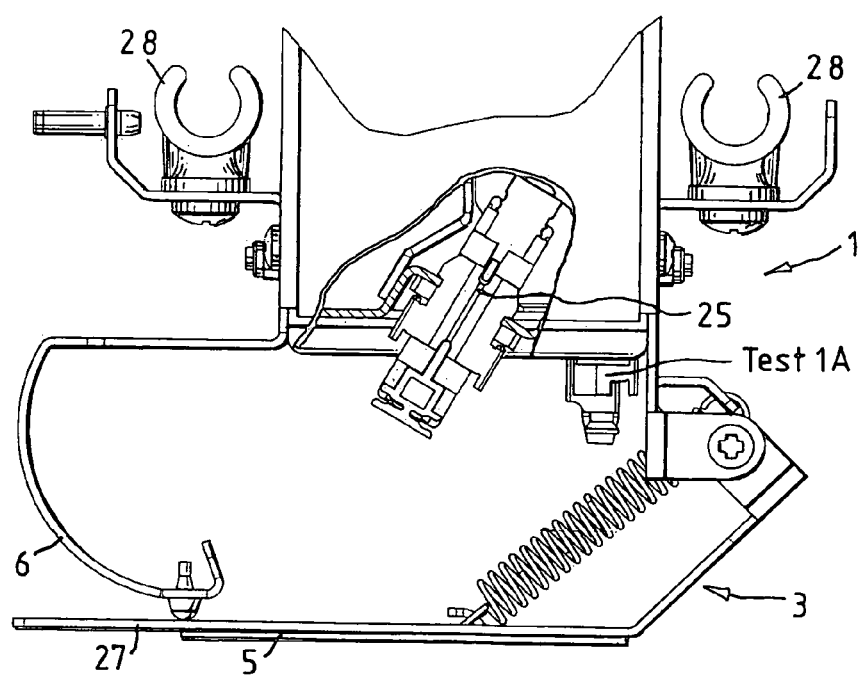
FIG. 8 shows a plan view with the cover closed.

FIG. 8 shows a plan view of the glass fiber monitoring module 1 with the cover 3. The couplings 25 are in this case illustrated with a plugged-on dust cover. The couplings 25 are in this case arranged at an angle with respect to the front side, with the result that it is very easy to maintain the minimum bending radii when deflecting about the deflecting element 6. At least one spacer 27, which leaves a minimum gap free between the deflecting element 6 and the cover 3 for the glass fibers or the multifiber cable 10 when the cover 3 is closed, is arranged on the deflecting element 6. The couplings Test 1–6A, on the other hand, are arranged perpendicular to the front side. Furthermore, arched snap-on elements 28 can also be seen, by means of which the glass fiber monitoring module 1 can be latched onto round rods. The couplings 25 are preferably in the form of SC couplings, whereas the couplings Test 1–6A are preferably in the form of LC couplings.

LIST OF REFERENCE NUMERALS

1 Glass fiber monitoring module
2 Housing
3 Cover
4 Plate

5 Front panel
6 Deflecting element
7 Guides
8 Side wall
9 Winding cover
10 Multifiber cable
11 Tube
12 Winding core
21 Coupler module
22 Coupler module
23 Mounting plate
24 Glass fiber
25 Couplings
26 Cable holder
27 Spacer
28 Snap-on element

The invention claimed is:

1. A glass fiber monitoring module, comprising
a mounting plate,
couplings for receiving plugs of incoming and outgoing glass fibers;
at least one coupler module being arranged on the mounting plate;
couplers being arranged in the coupler module and each coupler being used to split signals of one incoming glass fiber between at least two outgoing glass fibers at a predeterminable ratio, one of the two outgoing glass fiber transmitting a useful signal and the other glass fiber transmitting a test signal, wherein the glass fibers carrying the test signals are combined in the coupler module to form one multifiber cable;
a splitting element being arranged at one end of the multifiber cable remote from the coupler module and being used to split the multifiber cable into a number of monofiber cables which corresponds to the number of outgoing glass fibers transmitting a test signal; and
plugs being arranged at remote ends of said monofiber cables.

2. The glass fiber monitoring module as claimed in claim 1, wherein a holder for a reserve length of the multifiber cable is arranged on the mounting plate or on the coupler module, a variable connection length being made possible by winding up or unwinding the reserve length.

3. The glass fiber monitoring module as claimed in claim 2, wherein the holder comprises a winding core and a winding cover.

4. The glass fiber monitoring module as claimed in claim 1, wherein the incoming glass fibers are split in the coupler modules between three outgoing glass fibers, one outgoing glass fiber transmitting the useful signal and the other two outgoing glass fibers transmitting a test signal, one glass fiber carrying the test signal being combined to form the multifiber cable, and the other glass fiber carrying the test signal being passed to a coupling.

5. The glass fiber monitoring module as claimed in claim 1, wherein the glass fiber monitoring module comprises two coupler modules, which are arranged on the front and rear side of the mounting plate, the incoming glass fibers being split between the two coupler modules, the glass fibers, which are to be combined to form the multifiber cable, of one coupler module being passed to the other coupler module where they are combined to form the multifiber cable.

6. The glass fiber monitoring module as claimed in claim 1, wherein the mounting plate is arranged in a housing, a cover being arranged on the housing which covers the couplings, a deflecting element being arranged laterally, via which the incoming and outgoing fibers or cables are passed.

7. An optical fiber monitoring module, comprising:
a coupler module;
a plurality of circuits arranged within the coupler module, each circuit including:
a first coupler configured to split an incoming signal between a first outgoing signal and a second outgoing signal at a predeterminable ratio; and
a second coupler configured to split the first outgoing signal from the first coupler into a first test signal and a second test signal;
a face plate coupled to the coupler module;
a first plurality of optical couplings arranged on the face plate, the optical couplings of the first plurality being configured to receive optical fibers carrying incoming signals, and being configured to transmit the incoming signals to the first couplers of the circuits;
a second plurality of optical couplings arranged on the face plate, the optical couplings of the second plurality being configured to receive the second outgoing signals from the first couplers of the circuits and to transmit the second outgoing signals to optical fibers;
a cable holder arranged on the faceplate, the cable holder configured to receive a multifiber cable extending from the coupler module, the multifiber cable carrying the first test signals from the second couplers of the circuits; and
a third plurality of optical couplings arranged on the face plate, the optical couplings of the third plurality being configured to receive the second test signals from the second couplers of the circuits.

8. The monitoring module of claim 7, further comprising:
a splitting element being arranged at one end of the multifiber cable remote from the coupler module and being used to split the multifiber cable into a plurality of monofiber cables; and
plugs terminating the monofiber cables.

9. The monitoring module of claim 7, further comprising:
a housing enclosing the coupler module and being coupled to the face plate; and
a cover pivotably coupled to the housing, the cover being configured to pivot from a first position in which the cover covers the faceplate to a second position enabling access to the face plate.

10. The monitoring module of claim 9, wherein the cover is spaced from the face plate of the housing sufficient to enable fiber optic cables to extend from the optical couplings arranged on the face plate when the cover is in the first position.

11. The monitoring module of claim 9, further comprising a deflecting element extending between the housing and one side of the cover.

12. An optical fiber monitoring module, comprising:
a face plate;
a first plurality of optical couplings arranged on the face plate, the optical couplings of the first plurality being configured to receive optical fibers carrying incoming signals;
a coupler module coupled to the face plate, the coupler module being configured to receive incoming signals from the optical couplings of the first plurality and to split each incoming signal into an outgoing signal and a first test signal at a predeterminable ratio;

a second plurality of optical couplings arranged on the face plate, the optical couplings of the second plurality being configured to receive the outgoing signals from the coupler module;

a cable holder arranged on the faceplate, the cable holder configured to receive a multifiber cable extending from the coupler module, the multifiber cable carrying the first test signals from the coupler module; and a holder for accommodating a reserve length of the multifiber cable being coupled to the coupler module, the holder being configured to enable the multifiber cable to be selectively wound and unwound from the holder.

13. The monitoring module of claim 12, wherein the coupler module is further configured to generate a second test signal from each of the first test signals.

14. The monitoring module of claim 13, further comprising:

a third plurality of optical couplings arranged on the face plate, the optical couplings of the third plurality being configured to receive the second test signals from the coupler module.

* * * * *